June 16, 1959     D. T. LEWIS     2,890,581
TRANSMISSION LOCK
Filed Nov. 23, 1955
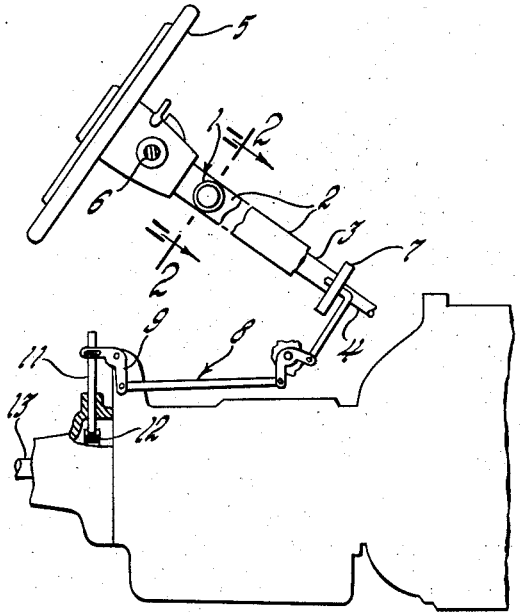
Fig.1
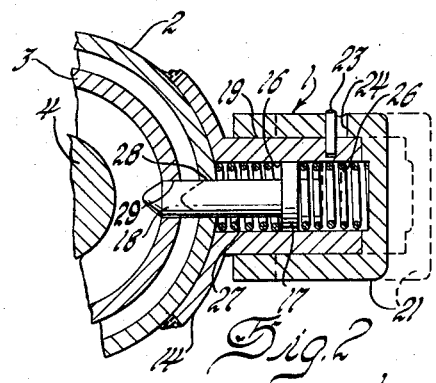
Fig.2
Fig.2a
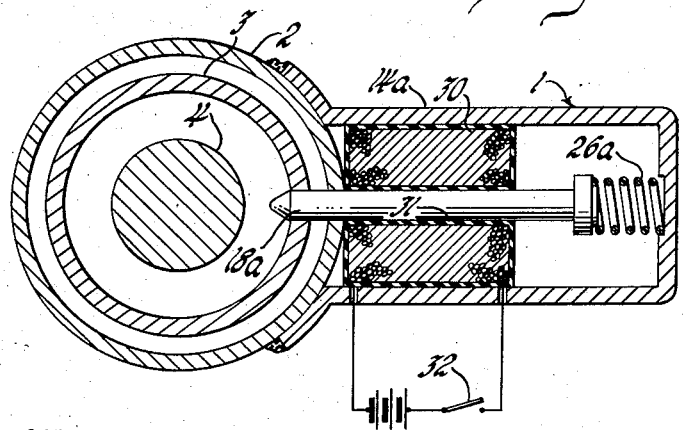
Fig.3
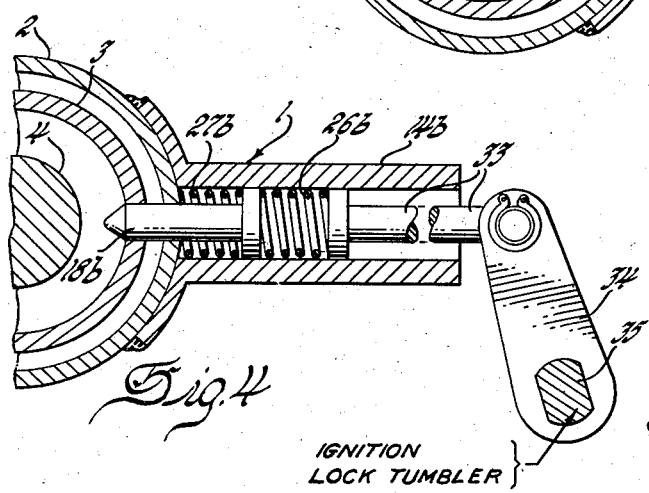
Fig.4
IGNITION LOCK TUMBLER
INVENTOR.
Douglas T. Lewis
BY
T. L. Chisholm
ATTORNEY United States Patent Office 2,890,581
Patented June 16, 1959

2,890,581

TRANSMISSION LOCK

Douglas T. Lewis, Royal Oak, Mich., assignor to General Motors Corporation, Detroit, Mich., a corporation of Delaware Application November 23, 1955, Serial No. 548,648

1 Claim. (Cl. 70—248)

This invention relates to automatic transmission parking brake controls generally, and more specifically to a safety lock adapted for use with a parking brake.

In general, since engine compression cannot be relied on for a brake or retarding means in those motor vehicles having an automatic transmission, it is necessary, when the vehicle is parked or otherwise inoperative, to provide a brake for locking the vehicle wheels against movement. For this purpose, a parking brake, rendered operative when a shift lever is in a park position, is usually provided which includes mechanism for locking a transmission output shaft against rotation. With such a parking brake, it is foreseeable that by accident a child could move the shift lever from the park position and permit the vehicle to move unrestrained. Also, an adult could inadvertently move the shift lever so that the rolling vehicle could cause serious damage before the conventional foot brake was applied.

The present invention contemplates solving this problem by providing a safety parking lock which is operative to hold a transmission shifting means in a park position until disengaged by a suitable means. With the parking brake holding the vehicle and the safety parking lock preventing movement of the shift lever, a positive act is required, thus discouraging any accidental or inadvertent release of the brake. This positive act may be that of closing the ignition switch prior to starting the vehicle motor or a manually operated device connected directly to the lock.

The foregoing and other objects and advantages of the invention will be apparent from the following description and from the accompanying drawings, in which:

Fig. 1 is a side view of a steering post having the subject lock in position for application to a transmission parking brake, Fig. 2 is a sectional view along line 2—2 of Fig. 1 showing the parking lock, Fig. 2a is a fragmentary view of a holding device for maintaining the parking lock in the engaged position shown in Fig. 2, Fig. 3 is a sectional view similar to Fig. 2 but showing a modified form of the invention, and Fig. 4 is a sectional view similar to Fig. 2 showing another modification of the invention.

In a preferred embodiment of the invention shown in Fig. 1, a parking lock 1 is shown mounted on a steering column 2 which encloses a rotatably mounted shifter member 3 and a steering gear shaft 4. Positioned above the parking lock 1 and below the steering wheel 5, a shift lever 6 is operatively connected to the shifter member 3 for coaction with the transmission controls (not shown) to provide a number of different control settings, for example, a forward drive, a reverse drive, a neutral, a low and a park position. When the shift lever 6 is moved to the park position, the shifter member 3 through an arm 7 affixed to its lower end, linkage designated generally as at 8, and a bell crank 9 will actuate a bolt 11 which engages the teeth of a toothed locking wheel 12 keyed in any suitable manner to a transmission output shaft 13. Provision is made for the park position to be the end of movement of the shift lever 6 in one direction so that movement to any of the other positions in the opposite direction will cause the bolt 11 in each position to be moved different distances always out of engagement with the toothed locking wheel 12.

In Figs. 2 and 2a, a lock housing 14, shown suitably affixed to the steering column 2, includes a bore 16 for reciprocally guiding a land 17 of a locking element or pin 18 and an annular peripheral portion 19 for slidably receiving a cup-shaped member 21 having two diametrically opposite L-shaped slots 22 which coact with pins 23 attached to the housing 14. When the cup-shaped member 21 is moved leftwardly towards the engaged position, the pins 23 will align with a leg of the L-shaped slot 22 so that, with a partial rotation of the button member 21, the pins 23 will move into the leg 24 of the slot 22, thus preventing axial movement of the cup-shaped member 21 in either direction. With the shift lever 6 in the park position and the cup-shaped member 21 in the engaged position, an apply spring 26 disposed between the land 17 of the locking element 18 and an inner surface of the cup-shaped member 21, will overcome the opposing force of a retracting spring 27, disposed between the land 17 and the steering column 2, and cause the locking element 18 to engage openings 28 and 29 in the steering column 2 and the shifter member 3, respectively. No relative movement can now occur between the steering column 2 and the shifter member 3, therefore, the shift lever 6 will be locked in the park position and the transmission output shaft 13 will be held against rotation by the bolt 11 and the locked wheel 12. To release the locking element 18 from the engaged position, it is only necessary to remove the pins 23 from the legs 24 of the L-shaped slots 22 by rotating the cup-shaped member 21, then retracting spring 27 will disengage the locking element 18.

In the modified form of the invention shown in Fig. 3, a lock housing 14a, suitably affixed to the steering column 2, encloses a solenoid 30 having an aperture 31 for receiving a locking element 18a which is normally locked by an apply spring 26a coacting between the lock housing 14a and an end portion of the locking element 18a. Withdrawal or retraction of the locking element 18a against the spring 26a occurs when the solenoid 30 is energized, in a well known manner, by closing an ignition switch 32 prior to starting the vehicle engine, both the switch 32 and the solenoid 30 being in a motor vehicle electrical system.

Fig. 4 shows another modified form of a parking lock somewhat similar to that shown in Fig. 2. A lock element 18b slidably disposed within a lock housing 14b attached to the steering column 2 is subject to the counteracting forces of a retracting spring 27b and an apply spring 26b as is the locking element 18 in Fig. 2. However, in this modification the apply force of the apply spring 26b is varied by a push rod 33 which is reciprocated by an attached crank arm 34 rotated by an associated drive shaft 35 suitably connected to an ignition lock tumbler. Rotation of the ignition lock tumbler to the "off" position (switch open) will through shaft 35, crank arm 34 and push rod 33 cause the spring 26b to overcome the opposition of spring 27b and move the locking element 18b into the engaged position. When the tumbler lock is rotated in the opposite direction, the locking element 18b will be disengaged by the spring 27b.

It can be seen that each of the above described variations of the lock require some positive act before the shift lever 6 can be moved from the park position, and therefore, an accidental movement is impossible.

I claim:

A lock for a vehicle transmission driven by an engine and having an output shaft comprising, in combination, a steering column, a shifter member supported by said steering column and coacting with said transmission and having a plurality of positions including a park position, a movable means operated by said shifter member when in the park position for locking the transmission output shaft against rotation, a lock housing attached to said steering column, a locking element slidable in said housing for engaging and locking said shifter member in the park position, the locking element having thereon a guide flange portion, a retracting spring engageable with said locking element guide flange portion to urge said locking element from engagement with said shifter member, a push rod slidably mounted in said housing adjacent said locking element and in tandem arrangement therewith, an apply spring positioned between said locking element flange portion and said push rod tending to bias said locking element into engagement with said shifter member when compressed by said push rod, a crank arm connected to said push rod, and an ignition lock tumbler remote from said lock housing and interconnected with said crank arm for actuating said push rod for engaging said lock element when said ignition lock tumbler is turned to the "off" position thereof.

References Cited in the file of this patent

UNITED STATES PATENTS

| | | |
|---|---|---|
| 1,267,887 | Mammen | May 28, 1918 |
| 1,398,905 | Luplow | Nov. 29, 1921 |
| 1,622,839 | Peterson | Mar. 29, 1927 |
| 1,641,811 | Hershey | Sept. 6, 1927 |
| 1,674,906 | Lamb | June 26, 1928 |
| 1,694,506 | Hershey | Dec. 11, 1928 |
| 1,985,190 | Mulloy | Dec. 18, 1934 |
| 2,306,358 | Kimbey | Dec. 22, 1942 |
| 2,314,568 | Wharam | Mar. 23, 1943 |
| 2,689,029 | McFarland | Sept. 14, 1954 |
| 2,747,396 | Gamby | May 29, 1956 |